US011869129B2

(12) United States Patent
Choi et al.

(10) Patent No.: US 11,869,129 B2
(45) Date of Patent: Jan. 9, 2024

(54) LEARNING APPARATUS AND METHOD FOR CREATING IMAGE AND APPARATUS AND METHOD FOR IMAGE CREATION

(71) Applicant: RESEARCH COOPERATION FOUNDATION OF YEUNGNAM UNIVERSITY, Gyeongsangbuk-do (KR)

(72) Inventors: Gyu Sang Choi, Daegu (KR); Jong Ho Han, Gyeongsangbuk-do (KR); Hyun Kwang Shin, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 18/027,326

(22) PCT Filed: Sep. 29, 2021

(86) PCT No.: PCT/KR2021/013316
§ 371 (c)(1),
(2) Date: Mar. 20, 2023

(87) PCT Pub. No.: WO2022/131497
PCT Pub. Date: Jun. 23, 2022

(65) Prior Publication Data
US 2023/0274479 A1 Aug. 31, 2023

(30) Foreign Application Priority Data

Dec. 18, 2020 (KR) .................. 10-2020-0178374

(51) Int. Cl.
*G06T 11/60* (2006.01)
*G06F 40/30* (2020.01)
(Continued)

(52) U.S. Cl.
CPC .............. *G06T 11/60* (2013.01); *G06F 40/30* (2020.01); *G06T 5/50* (2013.01); *G06T 7/49* (2017.01);
(Continued)

(58) Field of Classification Search
CPC . G06T 11/60; G06T 5/50; G06T 2207/20081; G06F 40/30
See application file for complete search history.

(56) References Cited

U.S. PATENT DOCUMENTS 10,713,821 B1    7/2020  Surya et al.
2012/0038797 A1* 2/2012  Jang .................. G06T 5/50
                                         348/241

(Continued)

FOREIGN PATENT DOCUMENTS

KR    10-2019-0080415 A    7/2019
KR    10-2019-0118108 A    10/2019
(Continued)

OTHER PUBLICATIONS

Zhu et al., "DM-GAN: Dynamic Memory Generative Adversarial Networks for Text-to-Image Synthesis", 2019, CVF (Year: 2019).*
(Continued)

*Primary Examiner* — YuJang Tswei
(74) *Attorney, Agent, or Firm* — The PL Law Group, PLLC

(57) ABSTRACT

A learning apparatus for image generation includes a preprocessing module configured to receive text for image generation and generate a sentence feature vector and a word feature vector from the received text, a first generative adversarial network (GAN) configured to receive the sentence feature vector from the preprocessing module and generate an initial image based on the received sentence feature vector, and a second generative adversarial network (Continued)

configured to receive the word feature vector generated by the preprocessing module and the initial image generated by the first generative adversarial network and generate a final image based on the word feature vector and the initial image.

6 Claims, 7 Drawing Sheets

(51) Int. Cl.
*G06T 5/50* (2006.01)
*G06T 7/49* (2017.01)
*G06V 10/46* (2022.01)
*G06V 30/10* (2022.01)

(52) U.S. Cl.
CPC ............... *G06T 2207/20081* (2013.01); *G06T 2207/20084* (2013.01); *G06T 2210/61* (2013.01); *G06V 10/469* (2022.01); *G06V 30/10* (2022.01)

(56) References Cited

U.S. PATENT DOCUMENTS

| | | | |
|---|---|---|---|
| 2016/0284065 A1* | 9/2016 | Cohen | G06T 5/002 |
| 2019/0124346 A1* | 4/2019 | Ren | G06N 3/044 |
| 2019/0333237 A1* | 10/2019 | Javidnia | G06T 7/593 |
| 2020/0167930 A1* | 5/2020 | Wang | G06N 3/08 |

FOREIGN PATENT DOCUMENTS

| | | |
|---|---|---|
| KR | 10-2019-0125029 A | 11/2019 |
| KR | 10-2020-0092491 A | 8/2020 |
| KR | 10-2287407 B1 | 8/2021 |

OTHER PUBLICATIONS

Zhen Zhu et al., "Asymmetric Non-local Neural Networks for Semantic Segmentation", 2019, CVF (Year: 2019).*
Wang et al., "Iterative non-local means filter for salt and pepper noise removal", 2016, Elsevier inc. (Year: 2016).*
Zhang et al., "Generating Informative and Diverse Conversational Responses via Adversarial Information Maximization", 2018, NeurIPS (Year: 2018).*
Ahn et al., "Text2Action: Generative Adversarial Synthesis from Language to Action", 2018, IEEE (Year: 2018).*
Xu et al., "AttnGAN: Fine-Grained Text to Image Generation with Attentional Generative Adversarial Networks", 2018, CVF (Year: 2018).*
International Search Report for PCT/KR2021/013316 dated Dec. 29, 2021.
Office action dated Apr. 15, 2021 from Korean Patent Office in a counterpart Korean Patent Application No. 10-2020-0178374 (English translation is also submitted herewith.).
Zhu, Minfeng et al., "DM-GAN: Dynamic Memory Generative Adversarial Networks for Text-to-Image Synthesis", Apr. 2, 2019, arXiv:1904.01310v1, pp. 1-9.
Han Zhang et al., "StackGAN: Text to Photo-realistic Image Synthesis with Stacked Generative Adversarial Networks", Aug. 5, 2017, arXiv:1612.03242v2.
Notice of Allowance dated Jul. 27, 2021 from Korean Patent Office in a counterpart Korean Patent Application No. 10-2020-0178374 (English translation is also submitted herewith.).

* cited by examiner

LEARNING APPARATUS AND METHOD FOR CREATING IMAGE AND APPARATUS AND METHOD FOR IMAGE CREATION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2021/013316, filed Sep. 29, 2021, which claims priority to the benefit of Korean Patent Application No. 10-2020-0178374 filed in the Korean Intellectual Property Office on Dec. 18, 2020, the entire contents of which are incorporated herein by reference.

BACKGROUND

1. Technical Field

Embodiments of the present disclosure relate to an image creation technology.

2. Description of Related Art

A generative model means a model for directly or indirectly obtaining the distribution of given data and generating data based on the distribution. A PixelCNN and generative adversarial network (GAN) have emerged as representative deep learning-based image generation models, and recently, GAN has been actively studied as the image generation model.

The GAN exhibits very good performance when the image to be generated is relatively simple, when the distribution in the dataset is similar, and so on. For example, when a human face image is generated, a human face may be generated as if it were a real one, from text generated mainly based on a human face style (eyes, nose, mouth, and hair style).

However, the image generation model has a problem in that, when the text of the image to be generated is complex, the initial image is incorrectly generated and an accurate image is not generated from the text.

SUMMARY

Embodiments of the present disclosure are intended to improve image generation quality from text of an image to be generated.

In one general aspect, there is provided a learning apparatus for image generation including; a preprocessing module configured to receive text for image generation and generate a sentence feature vector and a word feature vector from the received text; a first generative adversarial network (GAN) configured to receive the sentence feature vector from the preprocessing module and generate an initial image based on the received sentence feature vector; and a second generative adversarial network configured to receive the word feature vector generated by the preprocessing module and the initial image generated by the first generative adversarial network and generate a final image based on the word feature vector and the initial image.

The first generative adversarial network may include: a first generator configured to generate a random noise vector from the received sentence feature vector and generate an initial image based on the received sentence feature vector and the generated random noise vector; and a first discriminator configured to compare the initial image generated by the first generator with a preset first comparison image, determine whether the received image is the first comparison image or the generated initial image according to the comparison result, and feedback the determination result to the first generator.

The second generative adversarial network may include: a second generator configured to receive the word feature vector generated by the preprocessing module and the initial image generated by the first generative adversarial network, generate an enhanced image from the word feature vector and a feature map of the initial image based on a dynamic memory, generate a feature map of the enhanced image from the enhanced image by using a non-local block, and generate a final image from the word feature vector and the feature map of the enhanced image based on the dynamic memory; and a second discriminator configured to compare the final image generated by the second generator with a preset second comparison image, determine whether the received image is the second comparison image or the generated final image according to the comparison result, and feedback the determination result to the second generator.

The second generator may include: an image enhancement module configured to generate a key and a value for storage in the dynamic memory by combining the word feature vector with the initial image, extract a key similar to the generated key from among the generated key and a key pre-stored in the dynamic memory to calculate a similarity between the generated key and the extracted key, and output a weighted sum of the values based on the calculated similarity; and an image feature generation module configured to generate an enhanced image based on the output weighted sum and the initial image.

The second generator may further include a non-local block module configured to generate a feature map of the enhanced image from the generated enhanced image by using the non-local block.

The second generator may generate a final image from the word feature vector and the enhanced image through the image enhancement module and the image feature generation module when the feature map of the enhanced image is generated.

In another general aspect, there is provided an apparatus for image generation including; a preprocessing module configured to receive text for image generation and generate a sentence feature vector and a word feature vector from the received text; a first generative adversarial network (GAN) configured to receive the sentence feature vector from the preprocessing module and generate an initial image based on the received sentence feature vector; and a second generative adversarial network configured to receive the word feature vector generated by the preprocessing module and the initial image generated by the first generative adversarial network and generate a final image based on the word feature vector and the initial image.

The first generative adversarial network may generate a random noise vector from the received sentence feature vector and generate an initial image based on the received sentence feature vector and the generated random noise vector.

The second generative adversarial network may receive the word feature vector generated by the preprocessing module and the initial image generated by the first generative adversarial network, generate an enhanced image from the word feature vector and a feature map of the initial image based on a dynamic memory, generate a feature map of the enhanced image from the enhanced image by using a non-local block, and generate a final image from the word feature vector and the feature map of the enhanced image based on the dynamic memory.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
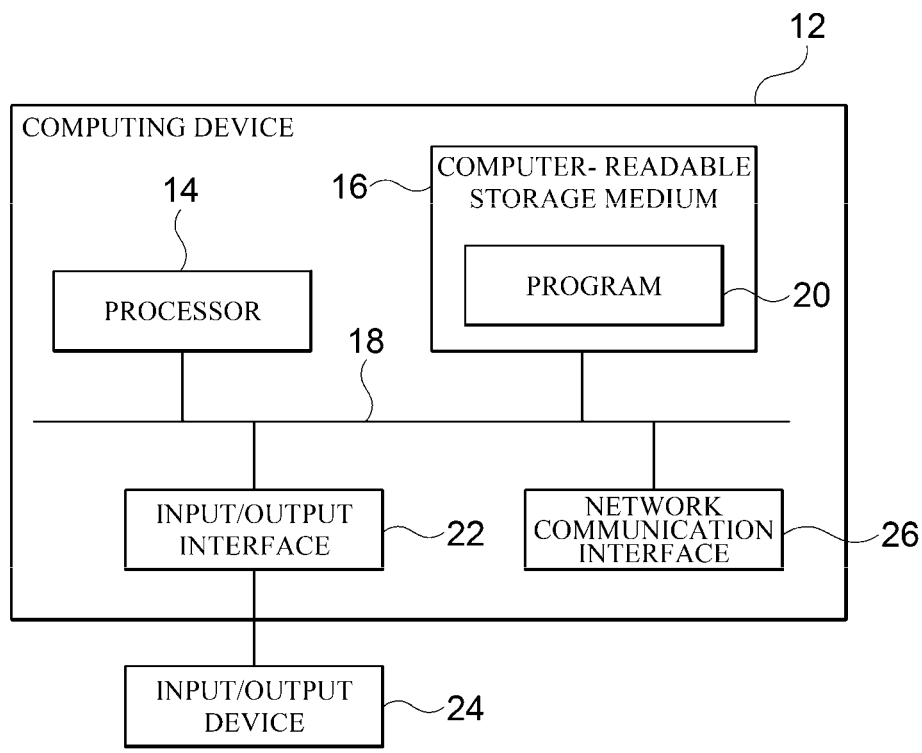
FIG. 1 is a block diagram exemplarily illustrating a computing environment that includes a computing device suitable for use in exemplary embodiments.

FIG. 1 is a block diagram exemplarily illustrating a computing environment 10 that includes a computing device suitable for use in exemplary embodiments. In the illustrated embodiments, each component may have different functions and capabilities in addition to those described below, and additional components may be included in addition to those described below.

The illustrated computing environment 10 includes a computing device 12. In an embodiment, the computing device 12 may be a learning apparatus 100 for image generation. Additionally, the computing device 12 may be an apparatus 800 for image generation.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to a computing device 12 as a separate device distinct from the computing device 12.

Figure 2:
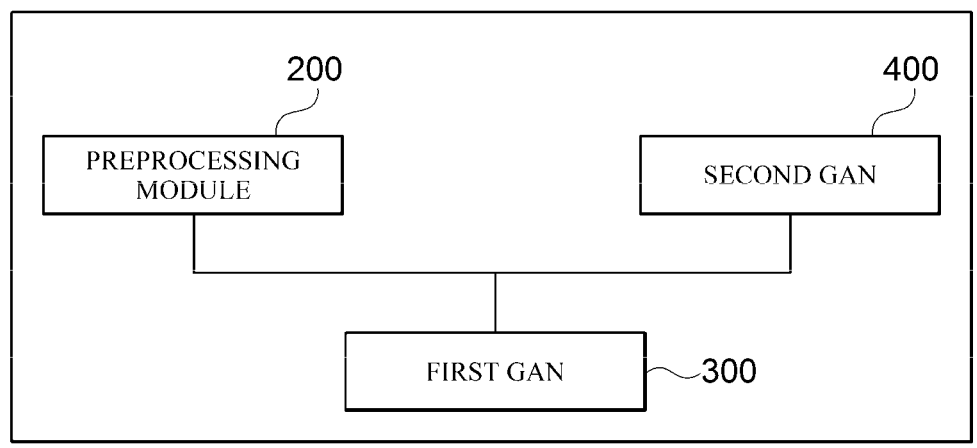
FIG. 2 is a block diagram showing a learning apparatus for image generation according to an embodiment of the present disclosure.

FIG. 2 is a block diagram showing a learning apparatus 100 for image generation according to an embodiment of the present disclosure.

As illustrated in FIG. 2, the learning apparatus 100 for image generation according to an embodiment of the present disclosure may include a preprocessing module 200, a first generative adversarial network (GAN) 300 (hereinafter referred to as a "first GAN") and a second generative adversarial network 400 (hereinafter referred to as a "second GAN").

Meanwhile, a generative adversarial network (GAN) according to an embodiment of the present disclosure may be composed of two networks including a generator and a discriminator. The generator learns given data and generates similar data from it as the role of a generative model. In addition, the discriminator is a kind of classifier that acquires data generated by the generator and distinguishes between data generated by the generator between actual data. Therefore, the purpose of the generator is to generate data similar to the data, and the purpose of the discriminator is to classify data into generated data and actual data. Therefore, the two networks are called a minimax relationship.

The preprocessing module 200 may receive text for image generation and generate sentence information and word information from the received text. Specifically, the preprocessing module 200 may receive text for image generation and filter the received text. For example, the preprocessing module 200 may remove unnecessary word descriptions and stop words from the received text using a natural language toolkit (NLTK). Here, the natural language toolkit (NLTK) is a device that provides a language processing function. In addition, the preprocessing module 200 may extract vector information by performing embedding on the filtered text, and may generate sentence information and word information from vector information extracted using a long short-time memory text encoder (LSTM text encoder). Here, a long short-time memory text encoder (LSTM text encoder) is a model capable of learning a compressed expression of data, and may classify the received text into sentence features and word features. Here, the sentence information may include a sentence feature vector, and the word information may include a word feature vector.

The first GAN 300 may receive sentence information from the preprocessing module 200, generate random noise information from the sentence information, and generate an initial image based on the received sentence information and the generated random noise information. Here, the random noise information is for adding noise similar to data (image, voice, text, or the like), and may be a vector sampled from a normal distribution of sentence feature vectors. Further, the random noise information may include a random noise vector.

Figure 3:
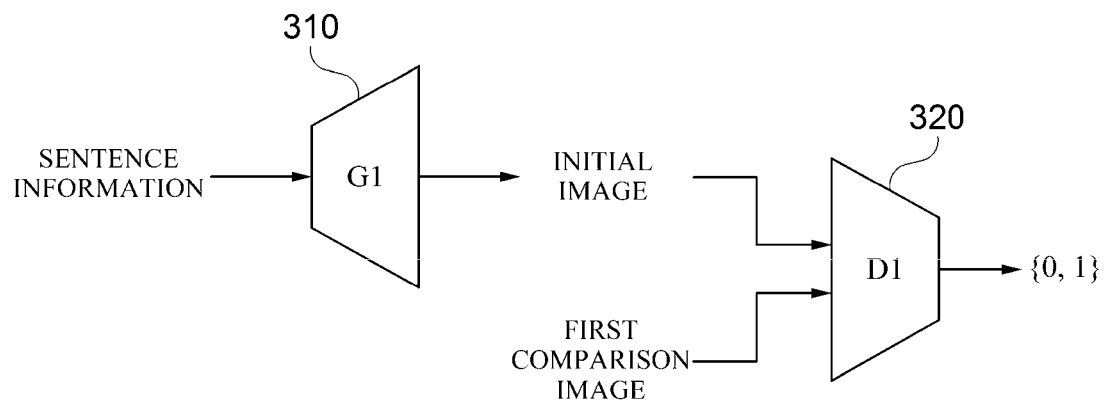
FIG. 3 is a block diagram for describing a first generative adversarial network in the learning apparatus for image generation according to an embodiment of the present disclosure.

FIG. 3 is a block diagram for describing a first generative adversarial network in the learning apparatus for image generation according to an embodiment of the present disclosure.

As shown in FIG. 3, the first GAN 300 according to an embodiment of the present disclosure may include a first generator 310 (G1) and a first discriminator 320 (D1).

The first generator 310 may receive sentence information from the preprocessing module 200 and generate random noise information from the sentence information.

In addition, the first generator 310 may generate an initial image based on the received sentence information and generated random noise information. For example, the first generator 310 may generate a feature map of the initial image by using a fully connected layer, a nearest neighbor upsampling layer, and a 3×3 convolution layer based on a sentence feature vector and a random noise vector. In addition, the first generator 310 may generate an initial image having a size of 64×64 by using the 3×3 convolution layer on the generated feature map of the initial image.

The first discriminator 320 may learn a first comparison image and the initial image generated by the first generator, and may determine whether the received image (initial image) is a comparison image or the generated image according to the learning result. Here, the first comparison image may refer to a real image captured by a photographing device such as a camera, and may be, for example, a real image of the initial image generated by text. The first discriminator 320 may feedback the determination result to the first generator 310, so that the image generated by the first generator 310 becomes more and more similar to the real one. The first discriminator 320 may output a value from 0 to 1 according to the similarity of the received image, and may output 1 in the case of the first comparison image.

When the initial image generated by the first generator 310 through the above-described learning process is sufficiently similar to the first comparison image, the first discriminator 320 is not able to discriminate the received initial image as the first comparison image or the generated image. When the first GAN 300 reaches such a state, the learning process ends, and then the first generator 310 generates an initial image according to the received text.

Referring back to FIG. 2, the second GAN 400 may receive the word information generated by the preprocessing module 200 and the initial image output from the first GAN 300 and generate a final image therefrom.

Figure 4:
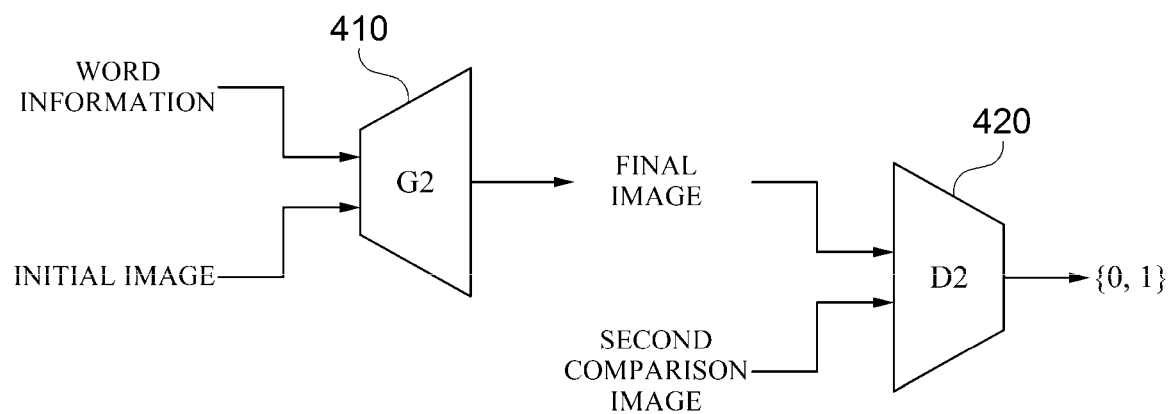
FIG. 4 is a block diagram for describing a second generative adversarial network in the learning apparatus for image generation according to an embodiment of the present disclosure.

FIG. 4 is a block diagram for describing a second generative adversarial network in the learning apparatus for image generation according to an embodiment of the present disclosure.

As shown in FIG. 4, the second GAN 400 according to an embodiment of the present disclosure may include a second generator 410 (G2) and a second discriminator 420 (D2).

The second generator 410 may receive the word information generated by the preprocessing module 200 and the initial image output from the first GAN 300, and generate a new image (enhanced image) from the word information and the feature map of the initial image based on a dynamic memory. In addition, the second generator 410 may generate a feature map of the enhanced image from the enhanced image by using the non-local block, and generate a final image from the word information and the feature map of the enhanced image based on the dynamic memory.

Figure 5:
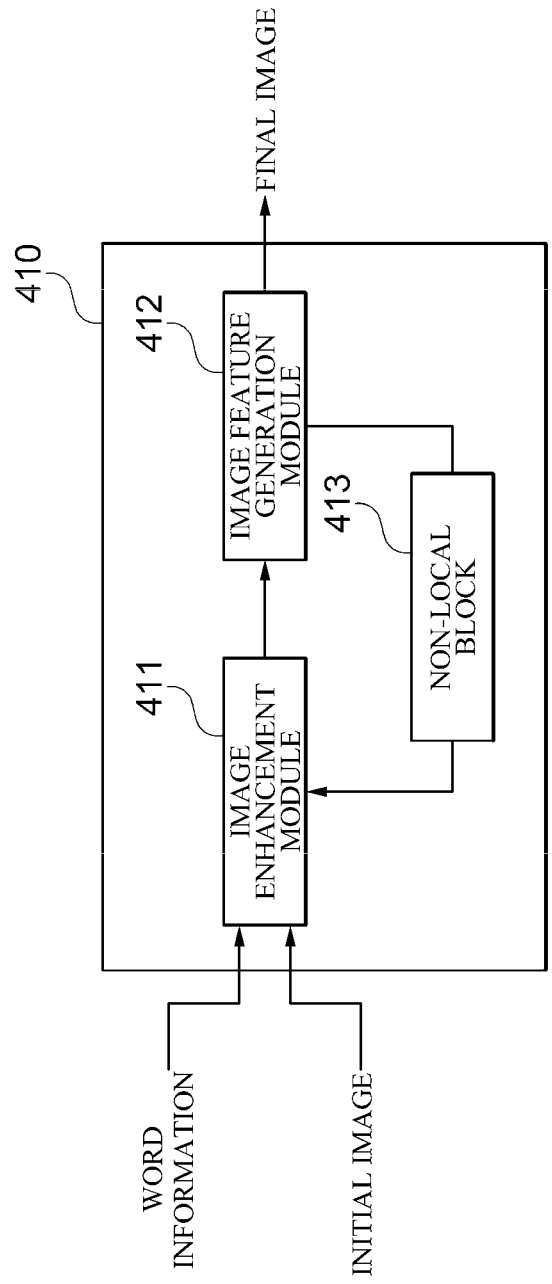
FIG. 5 is a block diagram for describing a second generator of the second generative adversarial network in the learning apparatus for image generation according to an embodiment of the present disclosure.

FIG. 5 is a block diagram for describing a second generator of the second generative adversarial network in the learning apparatus for image generation according to an embodiment of the present disclosure.

As shown in FIG. 5, the second generator 410 may include an image enhancement module 411, an image feature generation module 412, and a non-local block module 413. In an embodiment, the image enhancement module 411 and the image feature generation module 412 may be performed in the dynamic memory.

The image enhancement module 411 may receive the word information generated by the preprocessing module 200 and the initial image output from the first GAN 300, generate a key and a value by combining the word information with the initial image, and store the key and the value in the dynamic memory. For example, the image enhancement module 411 may calculate, through Equation 1 below, word importance $g_i^w$ from the word features (W=$\{w_1, w_2, \ldots, w_T\}$, $w_i \in R^{N_w}$, where T is the number of words and $N_w$ is the word feature dimension) and the initial image ($R_i=\{r_1, r_2, \ldots, r_N\}$, $r_i \in R^{N_r}$, where N is the number of pixels in the image and $N_r$ is the image feature dimension).

$$g_i^w(R, w_i) = \sigma\left(A * w_i + B * \frac{1}{N}\sum_{i=1}^{N} r_i\right) \quad \text{[Equation 1]}$$

(where, σ is a sigmoid function, A is a 1×$N_w$ matrix, and B is a 1×$N_r$ matrix)

In addition, the calculated word importance and a word feature Mw and an image feature $M_r$ embedded in the dynamic memory may be combined, the combined result may be structured as a key and a value through Equation 2 below and the key and the value may be stored in a dynamic memory slot $m_i$.

$$m_i = M_w(w_i) * g_i^w + M_r\left(\frac{1}{N}\sum_{i=1}^{N} r_i\right) * (1 - g_i^w) \qquad \text{[Equation 2]}$$

(where, $m_i$ is the i-th dynamic memory slot)

Further, the image enhancement module 411 may calculate a similarity between the generated key and a key pre-stored in the dynamic memory, and output a weighted sum of the values according to the calculated similarity. For example, the image enhancement module 411 may extract a dynamic memory slot (similar dynamic memory slot) associated with the generated key, and may calculate a similarity $\alpha_{i,j}$ between each extracted dynamic memory slot m and the image feature through Equation 3 below.

$$\alpha_{i,j} = \frac{\exp(\phi_K(m_i)^T r_j)}{\sum_{i=1}^{T}\exp(\phi_K(m_i)^T r_j)} \qquad \text{[Equation 3]}$$

(where, $\alpha_{i,j}$ is the similarity between the i-th dynamic memory slot and the j-th image feature, and $\phi K$ is a key memory access process) The image enhancement module 411 may output a weighted sum of the values according to the similarity calculated through Equation 4 below.

$$O_j = \sum_{i=1}^{T} \alpha_{i,j} \phi V(m_i) \qquad \text{[Equation 4]}$$

(where, $o_j$ is a weighted sum, and $\phi V$ is a value memory access process) The image feature generation module 412 may combine the output weighted sum with the initial image and generate a new image (enhanced image) by using an upsampling block and a residual block. Here, the upsampling block is for upscaling the image and may include a nearest neighbor upsampling layer and 3×3 convolution, and the residual block is for reducing the amount of computation and the number of parameters.

The non-local block module 413 may generate a feature map of the enhanced image from the generated enhanced image. Specifically, the non-local block module 413 may generate a feature map of the enhanced image by extracting similar pixels for all regions from the generated enhanced image and resetting the corresponding pixels to an average value of similar pixels.

Meanwhile, the image enhancement module 411 and the image feature generation module 412 may generate a final image from the word information and the feature map of the enhanced image when the feature map of the enhanced image is generated.

That is, the image enhancement module 411 may receive word information and a feature map of the enhanced image, generate a key and a value by combining the word information with the feature map of the enhanced image, calculate a similarity between the generated key and a key pre-stored in the dynamic memory, and output a weighted sum of the values according to the calculated similarity. In addition, the image feature generation module 412 may combine the output weighted sum with the feature map of the enhanced image, and generate a final image by using an upsampling block and a residual block.

The second discriminator 420 may learn the final image generated from the second comparison image and the second generator 410, and determine whether the received image (final image) is a comparison image or the generated image according to the learning result. Here, the second comparison image may refer to a real image captured by a photographing device such as a camera, and may be, for example, a real image of the final image generated from text. The second discriminator 420 may feedback the determination result to the second generator 410, so that the image generated by the second generator 410 becomes more and more similar to the real one. The second discriminator 420 may output a value between 0 and 1 according to the similarity of the received image, and may output 1 in the case of the second comparison image.

When the final image generated by the second generator 410 through the above-described learning process is sufficiently similar to the second comparison image, the second discriminator 420 is not able to discriminate the received final image as the second comparison image or the generated image. When the second GAN 400 reaches this state, the learning process ends, and then the second generator 410 generates a final image according to the received text and the initial image.

Figure 6:
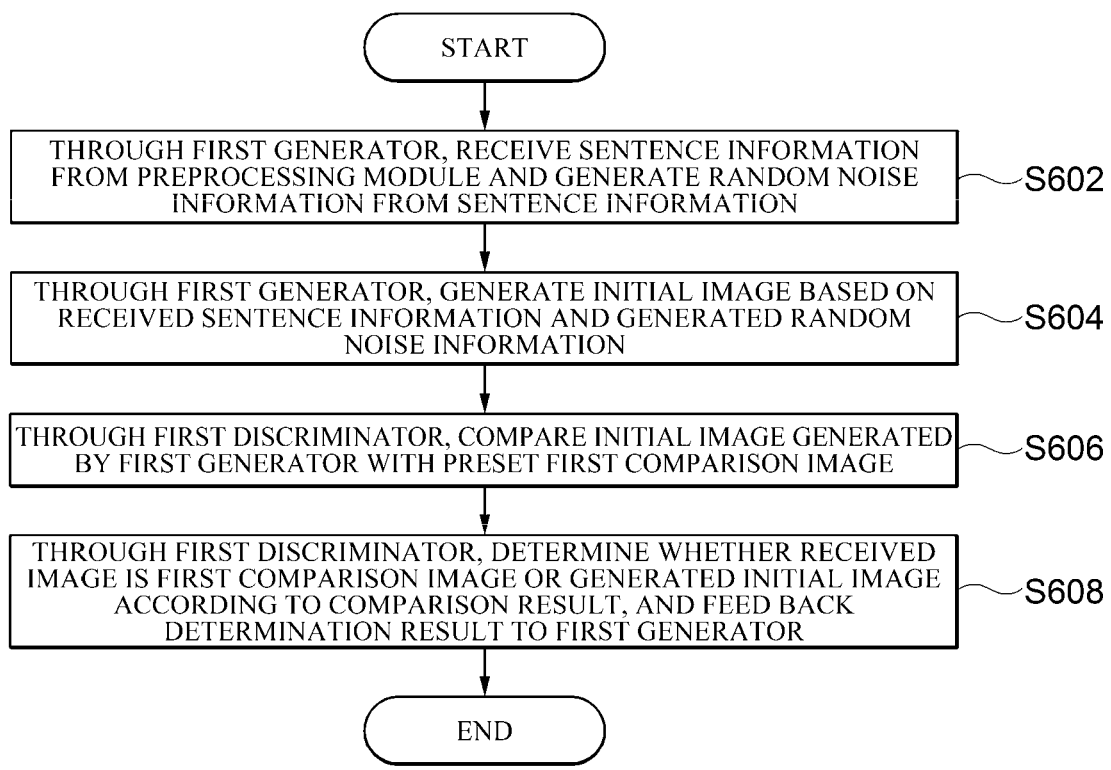
FIG. 6 is a flowchart illustrating a learning method for the first generative adversarial network in the learning apparatus for image generation according to an embodiment of the present disclosure.

FIG. 6 is a flowchart illustrating a learning method for the first generative adversarial network in the learning apparatus for image generation according to an embodiment of the present disclosure. As described above, the first generative adversarial network according to an embodiment of the present disclosure may be performed by a computing device 12 including one or more processors, and a memory storing one or more programs executed by the one or more processors. To this end, the first generative adversarial network may be implemented in the form of a program or software including one or more computer-executable instructions and stored in the memory.

Further, In the illustrated flowchart, the method is divided into a plurality of steps; however, at least some of the steps may be performed in a different order, performed together in combination with other steps, omitted, performed in subdivided steps, or performed by adding one or more steps not shown.

In step 602, through the first generator 310, the computing device 12 receives sentence information from the preprocessing module 200 and generates random noise information from the sentence information.

In step 604, through the first generator 310, the computing device 12 generates an initial image based on the received sentence information and the generated random noise information.

In step 606, through the first discriminator 320, the computing device 12 compares the initial image generated by the first generator 310 with a preset first comparison image.

In step 608, through the first discriminator 320, the computing device 12 determines whether the received image is the first comparison image or the generated initial image according to the comparison result, and feeds back the determination result to the first generator 310.

Figure 7:
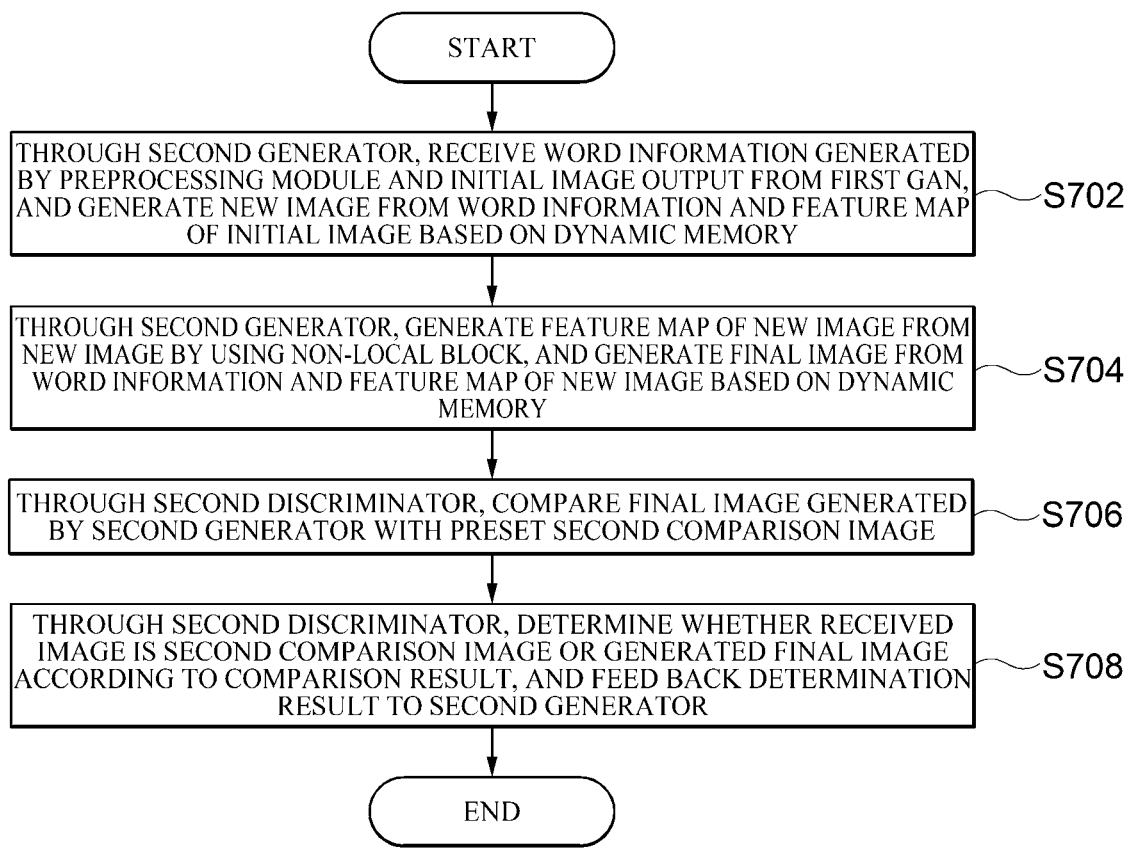
FIG. 7 is a flowchart illustrating a learning method for the second generative adversarial network in the learning apparatus for image generation according to an embodiment of the present disclosure.

FIG. 7 is a flowchart illustrating a learning method for the second generative adversarial network in the learning apparatus for image generation according to an embodiment of the present disclosure. As described above, the second generative adversarial network according to an embodiment of the present disclosure may be performed by a computing device 12 including one or more processors, and a memory storing one or more programs executed by the one or more processors. To this end, the second generative adversarial network may be implemented in the form of a program or software including one or more computer-executable instructions and stored in the memory.

Further, In the illustrated flowchart, the method is divided into a plurality of steps; however, at least some of the steps may be performed in a different order, performed together in combination with other steps, omitted, performed in subdivided steps, or performed by adding one or more steps not shown.

In step 702, through the second generator 410, the computing device 12 receives the word information generated by the preprocessing module 200 and the initial image output from the first GAN 300, and generates a new image (enhanced image) from the word information and the feature map of the initial image based on a dynamic memory.

In step 704, through the second generator 410, the computing device 12 generates a feature map of the enhanced image from the enhanced image by using the non-local block, and generates a final image from the word information and the feature map of the enhanced image based on the dynamic memory.

In step 706, through the second discriminator 420, the computing device 12 compares the final image generated by the second generator 410 with a preset second comparison image.

In step 708, through the second discriminator 420, the computing device 12 determines whether the received image is the second comparison image or the generated final image according to the comparison result, and feeds back the determination result to the second generator 410.

Figure 8:
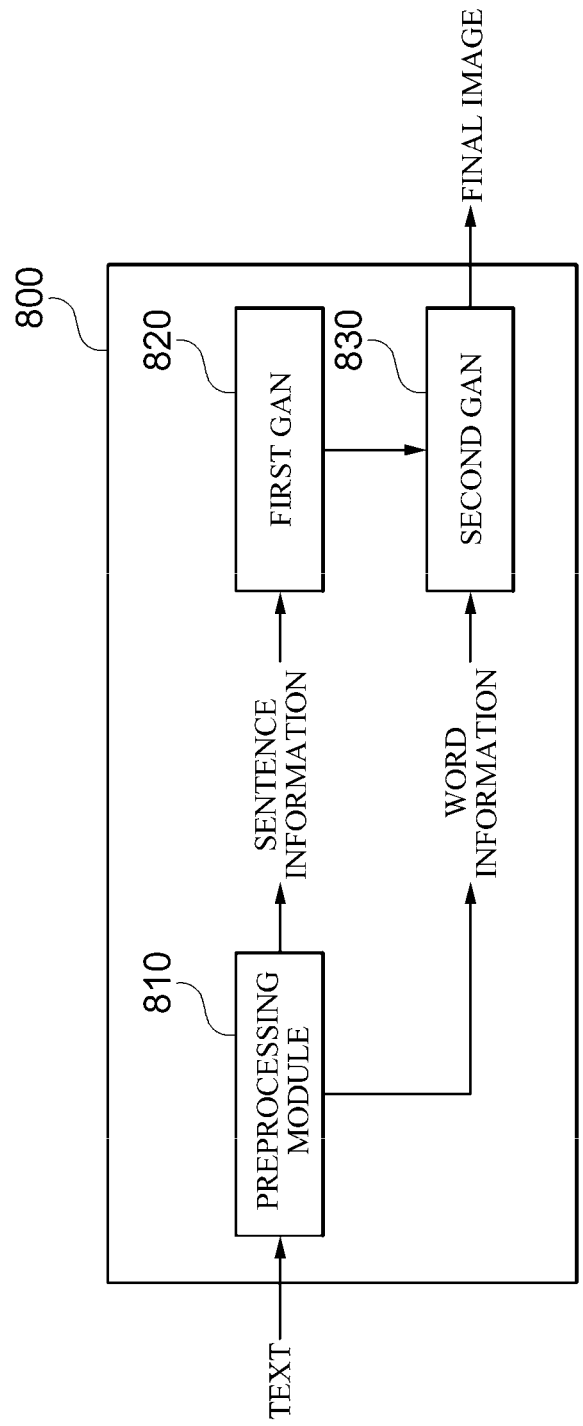
FIG. 8 is a block diagram showing an apparatus for image generation according to an embodiment of the present disclosure.

FIG. 8 is a block diagram showing an apparatus for image generation according to an embodiment of the present disclosure. Components corresponding to the components in the embodiments of the present disclosure described with reference to FIGS. 2 to 5 perform the same or similar functions as those described in the embodiments, and thus a detailed description thereof will be omitted.

As illustrated in FIG. 8, the apparatus 800 for image generation according to an embodiment of the present disclosure may include a preprocessing module 810, a first generative adversarial network 820 (hereinafter referred to as a "first GAN"), and a second generative adversarial network 830 (hereinafter referred to as a "second GAN"). In the present embodiment, the first GAN 820 and the second GAN 830 may be in a state in which training has been completed.

The first GAN 820 may receive sentence information from the preprocessing module 810, generate random noise information from the sentence information, and generate an initial image based on the received sentence information and the generated random noise information. Here, the random noise information is for adding noise similar to data (image, voice, text, or the like), and may be a vector sampled from a normal distribution of sentence feature vectors. Further, the random noise information may include a random noise vector.

The second GAN 830 may receive the word information generated by the preprocessing module 810 and the initial image output from the first GAN 820, and generate an enhanced image from the word information and the feature map of the initial image based on a dynamic memory. In addition, the second GAN 830 may generate a feature map of the enhanced image from the enhanced image by using the non-local block, and generate a final image from the word information and the feature map of the enhanced image based on the dynamic memory.

Therefore, according to the embodiments of the present disclosure, even if the initial image is erroneously generated from the text of the image to be generated, it is possible to generate an accurate final image that matches the meaning of the text based on the word feature and the initial image by using dynamic memory and non-local blocks.

Figure 9:
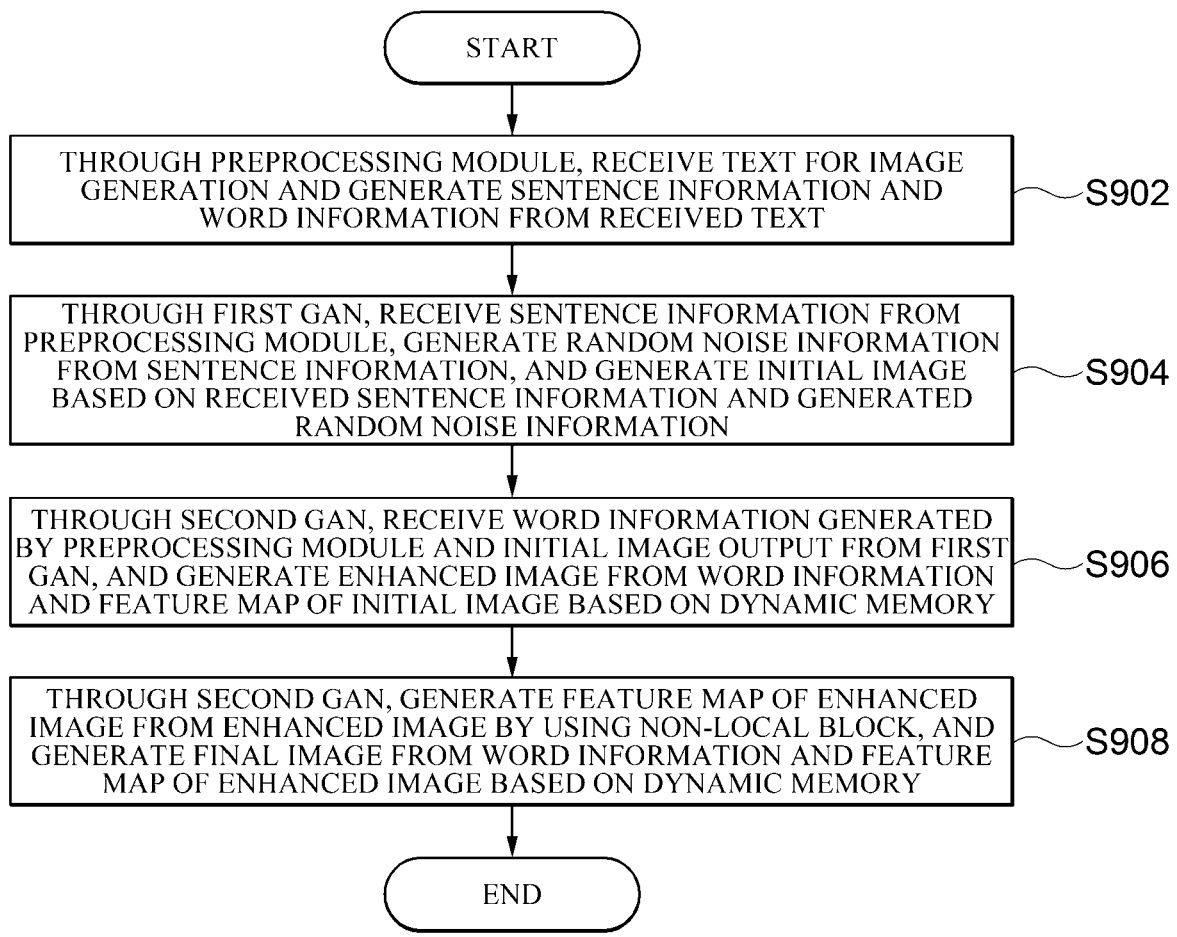
FIG. 9 is a flowchart illustrating a method for image generation according to an embodiment of the present disclosure.

FIG. 9 is a flowchart illustrating a method for image generation according to an embodiment of the present disclosure. As described above, the method for image generation according to an embodiment of the present disclosure may be performed by a computing device 12 including one or more processors, and a memory storing one or more programs executed by the one or more processors. To this end, the method for image generation may be implemented in the form of a program or software including one or more computer-executable instructions and stored in the memory.

Further, In the illustrated flowchart, the method is divided into a plurality of steps; however, at least some of the steps may be performed in a different order, performed together in combination with other steps, omitted, performed in subdivided steps, or performed by adding one or more steps not shown.

In step 902, through the preprocessing module 810, the computing device 12 receives text for image generation and generates sentence information and word information from the received text.

In step 904, through the first GAN 820, the computing device 12 receives sentence information from the preprocessing module 810, generates random noise information from the sentence information, and generates an initial image based on the received sentence information and the generated random noise information.

In step 906, through the second GAN 830, the computing device 12 receives the word information generated by the preprocessing module 810 and the initial image output from the first GAN 820, and generates an enhanced image from the word information and the feature map of the initial image based on a dynamic memory.

In step 908, through the second GAN 830, the computing device 12 generates a feature map of the enhanced image from the enhanced image by using the non-local block, and generates a final image from the word information and the feature map of the enhanced image based on the dynamic memory.

According to the aspects of the present disclosure, even if an initial image is erroneously generated by the text of an image to be generated, an accurate image matching the meaning of the text may be generated.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A learning apparatus for image generation, comprising:
   a preprocessing module configured to receive text for image generation and generate a sentence feature vector and a word feature vector from the received text;
   a first generative adversarial network (GAN) configured to receive the sentence feature vector from the preprocessing module and generate an initial image based on the received sentence feature vector; and
   a second generative adversarial network configured to receive the word feature vector generated by the preprocessing module and the initial image generated by the first generative adversarial network and generate a final image based on the word feature vector and the initial image,
   wherein the second generative adversarial network includes:
   a second generator configured to receive the word feature vector generated by the preprocessing module and the initial image generated by the first generative adversarial network, generate an enhanced image from the word feature vector and a feature map of the initial image based on a dynamic memory, generate a feature map of the enhanced image from the enhanced image by using a non-local block, and generate a final image from the word feature vector and the feature map of the enhanced image based on the dynamic memory; and
   a second discriminator configured to compare the final image generated by the second generator with a preset second comparison image, determine whether the received image is the second comparison image or the generated final image according to the comparison result, and feedback the determination result to the second generator,
   wherein the second generator includes:
   an image enhancement module configured to generate a key and a value for storage in the dynamic memory by combining the word feature vector with the initial image, extract a key similar to the generated key from among the generated key and a key pre-stored in the dynamic memory to calculate a similarity between the generated key and the extracted key, and output a weighted sum of the values based on the calculated similarity;
   an image feature generation module configured to generate an enhanced image based on the output weighted sum and the initial image; and
   a non-local block module configured to generate a feature map of the enhanced image by extracting similar pixels for all regions from the generated enhanced image and resetting the pixels to an average value of similar pixels by using the non-local block.

2. The learning apparatus for image generation of claim 1, wherein the first generative adversarial network includes:
   a first generator configured to generate a random noise vector from the received sentence feature vector and generate an initial image based on the received sentence feature vector and the generated random noise vector; and
   a first discriminator configured to compare the initial image generated by the first generator with a preset first comparison image, determine whether the received image is the first comparison image or the generated initial image according to the comparison result, and feedback the determination result to the first generator.

3. The learning apparatus for image generation of claim 1, wherein the second generator generates a final image from the word feature vector and the enhanced image through the image enhancement module and the image feature generation module when the feature map of the enhanced image is generated.

4. A learning method for image generation that is performed in a computing device including one or more processors and a memory storing one or more programs executed by the one or more processors, the learning method comprising:
   at a preprocessing module,
   receiving text for image generation and
   generating a sentence feature vector and a word feature vector from the received text;
   at a first generative adversarial network (GAN),
   receiving the sentence feature vector from the preprocessing module and
   generating an initial image based on the received sentence feature vector; and
   at a second generative adversarial network,
   receiving the word feature vector generated by the preprocessing module and the initial image generated by the first generative adversarial network and
   generating a final image based on the word feature vector and the initial image,
   wherein the generating of the final image includes:
   by a second generator,
   receiving the word feature vector generated by the preprocessing module and the initial image generated by the first generative adversarial network,
   generating an enhanced image from the word feature vector and a feature map of the initial image based on a dynamic memory,
   generating a feature map of the enhanced image from the enhanced image by using a non-local block, and
   generating a final image from the word feature vector and the feature map of the enhanced image based on the dynamic memory; and
   by a second discriminator,
   comparing the final image generated by the second generator with a preset second comparison image,
   determining whether the received image is the second comparison image or the generated final image according to the comparison result, and
   feeding back the determination result to the second generator,
   wherein the generating of the final image includes:
   by an image enhancement module,
   generating a key and a value for storage in the dynamic memory by combining the word feature vector with the initial image,
   extracting a key similar to the generated key from among the generated key and a key pre-stored in the dynamic memory to calculate a similarity between the generated key and the extracted key, and
   outputting a weighted sum of the values based on the calculated similarity;
   by an image feature generation module,
   generating an enhanced image based on the output weighted sum and the initial image; and
   by a non-local block module,
   generating a feature map of the enhanced image by extracting similar pixels for all regions from the generated enhanced image and resetting the pixels to an average value of similar pixels by using the non-local block.

5. The learning method for image generation of claim 4, wherein the generating of the initial image includes:

by a first generator,
generating a random noise vector from the received sentence feature vector and
generating an initial image based on the received sentence feature vector and the generated random noise vector; and by a first discriminator,
comparing the initial image generated by the first generator with a preset first comparison image,
determining whether the received image is the first comparison image or the generated initial image according to the comparison result, and
feeding back the determination result to the first generator.

6. The learning method for image generation of claim 4, wherein the generating of the final image further includes, by the second generator, generating a final image from the word feature vector and the enhanced image through the image enhancement module and the image feature generation module when the feature map of the enhanced image is generated.

* * * * *